(12) United States Patent
Hasegawa et al.

(10) Patent No.: US 10,992,210 B2
(45) Date of Patent: Apr. 27, 2021

(54) STATOR, MOTOR, AND STATOR MANUFACTURING METHOD

(71) Applicant: Mitsubishi Electric Corporation, Tokyo (JP)

(72) Inventors: Haruyuki Hasegawa, Tokyo (JP); Fumiaki Tsuchiya, Tokyo (JP); Toshihiro Tanaka, Tokyo (JP); Tomohisa Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/762,514

(22) PCT Filed: Jan. 29, 2018

(86) PCT No.: PCT/JP2018/002750
§ 371 (c)(1),
(2) Date: May 8, 2020

(87) PCT Pub. No.: WO2019/146108
PCT Pub. Date: Aug. 1, 2019

(65) Prior Publication Data
US 2020/0395826 A1    Dec. 17, 2020

(51) Int. Cl.
*H02K 11/00*     (2016.01)
*H02K 15/02*     (2006.01)
(Continued)

(52) U.S. Cl.
CPC ............ *H02K 15/026* (2013.01); *H02K 1/18* (2013.01); *H02K 1/182* (2013.01); *H02K 1/22* (2013.01);
(Continued)

(58) Field of Classification Search
CPC ............ H02K 15/026; H02K 15/0068; H02K 15/028; H02K 15/14; H02K 5/225;
(Continued)

(56) References Cited

U.S. PATENT DOCUMENTS 3,350,587 A    10/1967  Turk
4,540,962 A     9/1985  Gresley et al.
(Continued)

FOREIGN PATENT DOCUMENTS

JP    61-006805 A    1/1986
JP    2875666 B2     3/1999
(Continued)

OTHER PUBLICATIONS

International Search Report and Written Opinion dated Mar. 27, 2018 for PCT/JP2018/002750 filed on Jan. 29, 2018, 9 pages including English Translation of the International Search Report.
Notification of Decision to Grant a Patent received for Japanese Patent Application No. 2018-565079, dated Feb. 12, 2019, 5 pages including English Translation.

*Primary Examiner* — Thanh Lam
(74) *Attorney, Agent, or Firm* — Xsensus LLP

(57) ABSTRACT

A stator includes an insulator, a wire, a stator core, a cylindrical hollow terminal through which the stator is to be electrically connected, and a resinous molding material covering the stator core and an outer face of the hollow terminal. An inner face of the hollow terminal is exposed from the molding material, and a first end of the hollow terminal is open to the outside of the molding material.

4 Claims, 10 Drawing Sheets

(51) Int. Cl.
*H02K 15/00* (2006.01)
*H02K 15/14* (2006.01)
*H02K 1/18* (2006.01)
*H02K 15/12* (2006.01)
*H02K 15/08* (2006.01)
*H02K 5/22* (2006.01)
*H02K 5/08* (2006.01)
*H02K 1/22* (2006.01)

(52) U.S. Cl.
CPC ............... *H02K 5/08* (2013.01); *H02K 5/22* (2013.01); *H02K 5/225* (2013.01); *H02K 15/0068* (2013.01); *H02K 15/028* (2013.01); *H02K 15/08* (2013.01); *H02K 15/12* (2013.01); *H02K 15/14* (2013.01)

(58) Field of Classification Search
CPC .. H02K 5/08; H02K 5/22; H02K 1/18; H02K 1/182; H02K 1/22; H02K 15/08; H02K 15/12
USPC ............................................. 310/43, 71, 194
See application file for complete search history.

(56) References Cited

U.S. PATENT DOCUMENTS

| | | | | |
|---|---|---|---|---|
| 4,586,245 | A | 5/1986 | Gresley et al. | |
| 6,359,354 | B1* | 3/2002 | Watanabe | H02K 5/08 310/154.45 |
| 2003/0160532 | A1* | 8/2003 | Suzuki | H02K 5/08 310/194 |
| 2005/0280320 | A1* | 12/2005 | Utsumi | H02K 24/00 310/43 |
| 2014/0232212 | A1* | 8/2014 | Miyamoto | H02K 3/38 310/43 |

FOREIGN PATENT DOCUMENTS

| | | | |
|---|---|---|---|
| JP | 2001-352705 A | | 12/2001 |
| JP | 2005-080445 A | | 3/2005 |
| JP | 2005080445 A | * | 3/2005 |
| JP | 2011-146230 A | | 7/2011 |
| JP | 2014-180191 A | | 9/2014 |

* cited by examiner

STATOR, MOTOR, AND STATOR MANUFACTURING METHOD

CROSS-REFERENCE TO RELATED APPLICATION

The present application is based on PCT filing PCT/JP2018/002750, filed Jan. 29, 2018, the entire contents of which are incorporated herein by reference.

FIELD

The present invention relates to a stator including a stator core, a motor including the stator and a rotor, and a method for manufacturing the stator.

BACKGROUND

A stator taught in Patent Literature 1 includes a stator core, a wire wound around the stator core, a protruding portion that protrudes from the outer circumference of the stator core outward in the radial direction of the stator core, and a conductive material fixed to the protruding portion and electrically connected with the wire. Some of stators of the related art having such a structure as described above are so-called molded stators in which a stator core, a wire, a terminal, and the like are covered with a molding material by injection of resin after containing the stator core, the wire, the terminal, and the like in a die. In this type of stator, for electrical connection between wiring extending from a device outside the stator and a terminal provided in the stator, a structure in which an end of the terminal of the stator is exposed to the outside of the molding material and the wiring is connected with the terminal exposed from the molding material is adopted.

CITATION LIST

Patent Literature

Patent Literature 1: Japanese Patent No. 2875666

SUMMARY

Technical Problem

The stator described in Patent Literature 1, however, has problems in that work such as welding, soldering, pressure bonding or the like is needed for connecting the wiring with the terminal exposed from the molding material, which is troublesome and lowers the stator productivity.

The present invention has been made in view of the above, and an object thereof is to provide a stator capable of increasing productivity.

Solution to Problem

In order to solve the above-described problem and achieve the object, a stator according to the present invention includes a stator core. The stator further includes: a cylindrical hollow terminal through which the stator is to be electrically connected; and a molding material covering the stator core and an outer face of the hollow terminal. An inner face of the hollow terminal is exposed from the molding material, and a first end of the hollow terminal is open to an outside of the molding material.

Advantageous Effects of Invention

A stator according to the present invention produces an effect of increasing productivity.

DESCRIPTION OF EMBODIMENTS

A stator, a motor, and a stator manufacturing method according to an embodiment of the present invention will be described in detail below with reference to the drawings. Note that the present invention is not limited to the embodiment.

Embodiment

Figure 1:
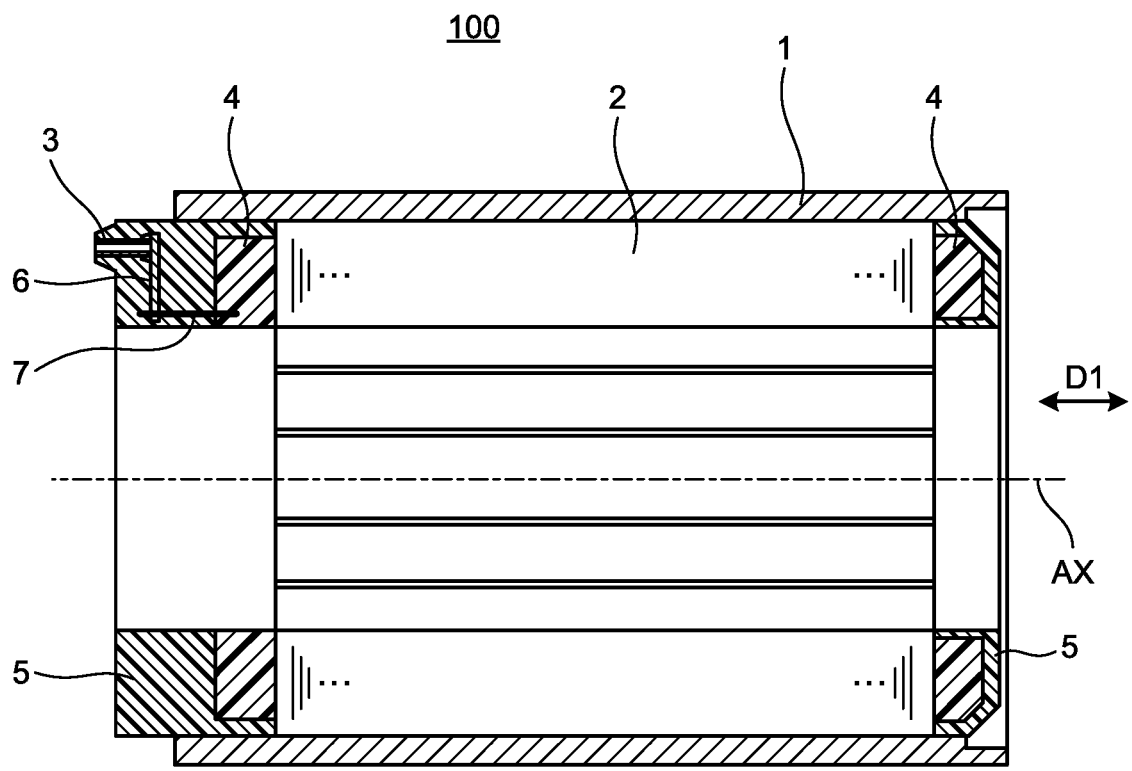
FIG. 1 is a cross-sectional view of a stator according to an embodiment of the present invention.
Figure 2:
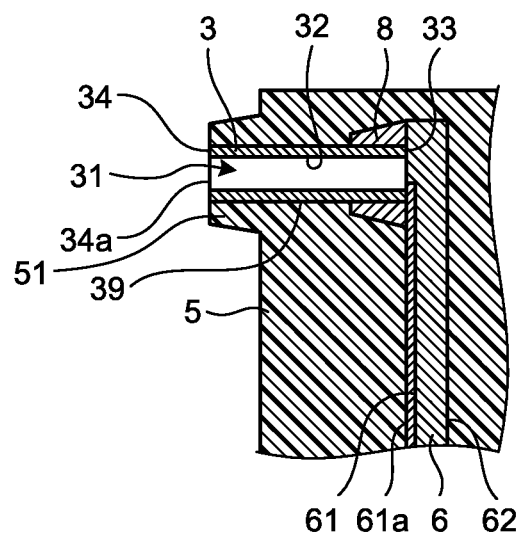
FIG. 2 is an enlarged view of a hollow terminal illustrated in FIG. 1.
Figure 3:
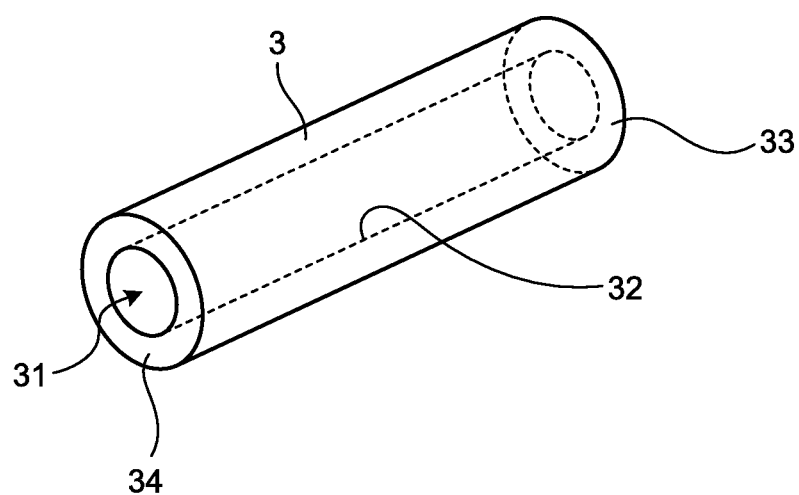
FIG. 3 is a perspective view of the hollow terminal illustrated in FIG. 1.

FIG. 1 is a cross-sectional view of a stator according to the embodiment of the present invention. FIG. 2 is an enlarged view of a hollow terminal illustrated in FIG. 1. FIG. 3 is a perspective view of the hollow terminal illustrated in FIG. 1. A structure of a stator 100 according to the embodiment will be described with reference to FIGS. 1, 2, and 3. As illustrated in FIG. 1, the stator 100 includes a frame 1, a stator core 2, a hollow terminal 3, an insulator 4, a molding material 5, a printed circuit board 6, and a wire 7. An axial direction that is a direction in which the central axis AX of the stator core 2 extends is indicated by an arrow D1 in FIG. 1. Hereinafter, the axial direction D1 of the central axis AX may simply be referred to as the axial direction.

The frame 1 is a cylindrical member. Examples of the material for the frame 1 include a copper alloy, cast iron, steel, an iron alloy, an aluminum alloy, and an austenitic stainless steel alloy. The stator core 2 arranged inside the frame 1 is made of a plurality of thin sheets obtained by punching an electromagnetic steel sheet base material into an annular shape and laminated in the axial direction. The thin sheets are fixed to each other by swaging, welding, or adhesion. The stator core 2 is constituted by a cylindrical core back, and a plurality of teeth extending from the inner side of the core back toward the central axis AX. Note that the stator core 2 is not limited to a laminate of a plurality of thin sheets obtained by punching an electromagnetic steel sheet base material into an annular shape, but may be an annular array in the rotating direction about the central axis AX of laminates of thin sheets punched to have a T-shape in cross section perpendicular to the axial direction.

The insulator 4 is arranged around the stator core 2. Examples of the material for the insulator 4 include insulating resin such as polybutylene terephthalate, polyphenylene sulfide, and a liquid crystal polymer. The wire 7 is a magnet wire coiled around the stator core 2 with the insulator 4 therebetween. The magnet wire is constituted by a conductive electric wire and an insulator provided on the surface of the electric wire. Examples of the material for the electric wire include copper and a copper alloy. In FIG. 1, only one end of the magnet wire connected with the printed circuit board 6 is illustrated as the wire 7. The printed circuit board 6 is positioned at an interval in the axial direction from the insulator 4. The shape of the printed circuit board 6 may be an annular shape continuous in the rotating direction about the central axis AX or may be a rectangular plate shape. As illustrated in FIG. 2, one board surface 62 of the printed circuit board 6 is on the insulator 4 side and the other board surface 61 of the printed circuit board 6 is on the side opposite to the insulator 4 side of the printed circuit board 6. A binding pin, which is not illustrated, is provided on the insulator 4, and the end of the wire 7 is wound around the binding pin and connected with pattern wiring 61a on the printed circuit board 6 illustrated in FIG. 2. The binding pin may be a winding start binding pin for binding a winding start portion of the magnet wire into a bundle at the start of winding the magnet wire around the stator core 2, a winding end binding pin for binding a winding end portion of the magnetic wire wound around the stator core 2 into a bundle. The winding start portion of the magnet wire and winding end portion of the magnet wire correspond to respective ends of the wire 7. The pattern wiring 61a can be wiring for supplying power to the wire 7, for example, but is not limited thereto, and may be connected with a thermistor provided on the printed circuit board 6 to detect the temperature of the stator 100 or may be connected with a Hall element for detecting the rotational position of a rotor mounted on the stator 100, for example. While the pattern wiring 61a is provided on the board surface 61 opposite to the insulator 4 side of the printed circuit board 6 in FIG. 2, the pattern wiring 61a may be provided on the board surface 62 on the insulator 4 side of the printed circuit board 6 as long as the hollow terminal 3 and the wire 7 can be electrically connected with each other. Details of the structure of the hollow terminal 3 will be described later.

As illustrated in FIGS. 2 and 3, the hollow terminal 3 is a cylindrical conductive member having an inner face 32 at which electrical connection with the outside of the stator 100 is provided. A cavity 31 is formed inside the hollow terminal 3. The cavity 31 is a space defined by the inner face 32 of the hollow terminal 3. The cavity 31 has a circular cross section perpendicular to the axial direction. Note that the shape of the hollow terminal 3 is not limited to the cylindrical shape but may be a polygonal cylinder shape. The cross section perpendicular to the axial direction of the cavity 31 has such a size that a conductive terminal, which will be described later, can be inserted and that at least part of the surface of the terminal inserted into the cavity 31 can come into contact with the inner face 32 of the hollow terminal 3. Examples of the material for the hollow terminal 3 include a copper alloy, cast iron, steel, and an iron alloy.

As illustrated in FIG. 2, an end 33, which is a second end, of the hollow terminal 3 in the axial direction is in contact with the board surface 61 of the printed circuit board 6. The end 33 of the hollow terminal 3 is the end on the printed circuit board 6 side of the hollow terminal 3. The end 33 of the hollow terminal 3 is fixed to the printed circuit board 6 by soldering in a state in which the end 33 is open. Specifically, the hollow terminal 3 is fixed to the printed circuit board 6 by soldering providing solder 8 between an outer face 39 of the hollow terminal 3 on the side of the end 33 and the printed circuit board 6 in a state in which the end 33 of the hollow terminal 3 is put onto the printed circuit board 6. As a result, the hollow terminal 3 is electrically connected with the wire 7 illustrated in FIG. 1 via the solder 8 and the pattern wiring 61a.

Note that the connection of the hollow terminal 3 with the pattern wiring 61a may be made through brazing or welding instead of soldering as long as the pattern wiring 61a and the hollow terminal 3 are electrically connected with each other. In addition, while the end 33 of the hollow terminal 3 is in contact with the board surface 61 of the printed circuit board 6 in FIG. 1, the hollow terminal 3 may be fixed to the printed circuit board 6 by insertion of the end 33 of the hollow terminal 3 into a through-hole formed in the printed circuit board 6. The insertion of the hollow terminal 3 into the through-hole of the printed circuit board 6 prevents or reduces misalignment of the hollow terminal 3, that is, in particular, misalignment of the hollow terminal 3 in a direction perpendicular to the axial direction, which makes the work of connecting the hollow terminal 3 to the pattern wiring 61a by soldering, brazing, or welding easier.

In addition, the end 33 of the hollow terminal 3 may have a projecting portion extending in a radial direction from the end 33 of the hollow terminal 3. The provision of the projecting portion increases the area of contact between the end 33 of the hollow terminal 3 and the printed circuit board 6 and the hollow terminal 3 can be stably placed on the printed circuit board 6 as compared with the case where no projecting portion is provided, which increases the work efficiency of soldering.

An end 34, which is a first end, of the hollow terminal 3 in the axial direction is open so that a conductive terminal, which will be described later, can be inserted thereinto. The inner face 32 of the hollow terminal 3 is exposed from a protruding molding material 51, and is open to the outside of the protruding molding material 51 at the end 34 of the hollow terminal 3. The end 34 of the hollow terminal 3 is the end opposite to the printed circuit board 6 side of the hollow terminal 3, and exposes on the surface of the protruding molding material 51. Although the end 34 of the hollow terminal 3 is preferably exposed on the surface of the protruding molding material 51, the electrical connection between the conductive terminal to be described later and the hollow terminal 3 can be obtained even when a residual from cutting the protruding molding material 51 or the like is attached to the end 34 of the hollow terminal 3, as long as at least part of the inner face 32 of the hollow terminal 3 is not covered by the molding material 5.

Note that the number of hollow terminals 3 is not limited to one, but may be more than one. For example, the stator 100 may include a hollow terminal 3 for supplying power to the wire 7, a hollow terminal 3 for transmitting temperature information detected by a thermistor, which is not illustrated, to a device outside the stator 100, and a hollow terminal 3 for transmitting position information detected by a Hall element, which is not illustrated, to a device outside the stator 100. In a case where a plurality of hollow terminals 3 are provided, the number of pattern wirings 61*a* provided on the printed circuit boards 6 corresponds to the number of hollow terminals 3. In addition, the direction in which the hollow terminal 3 extends is not limited to a direction parallel to the axial direction, but may be a direction at an angle to the axial direction.

The molding material 5 is made of thermosetting resin covering the stator core 2, the hollow terminal 3, the solder 8, the pattern wiring 61*a* on the printed circuit board 6, the board surface 61 of the printed circuit board 6, the board surface 62 of the printed circuit board 6, and the insulator 4. Examples of the material for the molding material 5 include unsaturated polyester resin, vinyl ester resin, epoxy resin, phenolic resin, varnish resin, and silicone resin.

Figure 4:
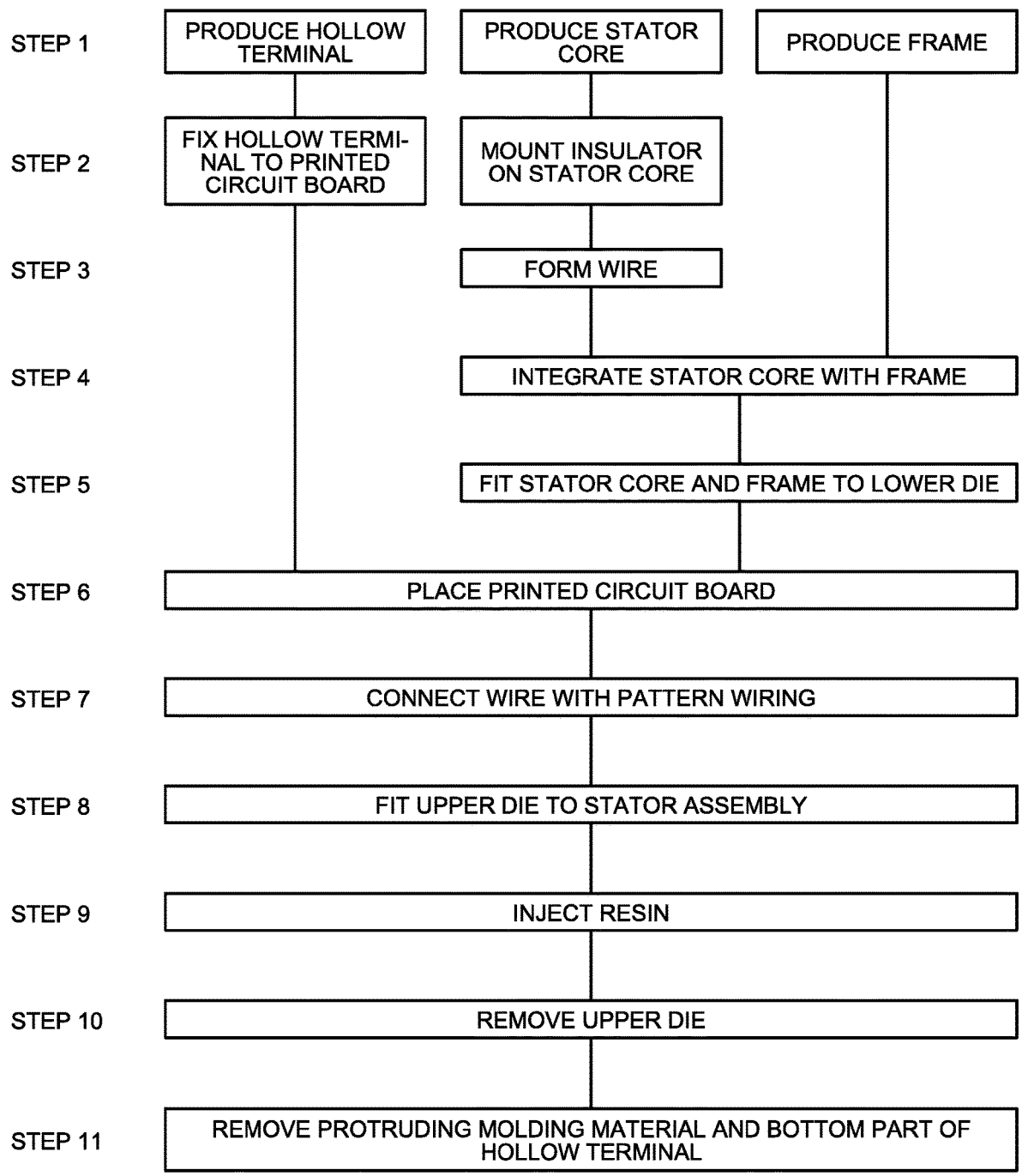
FIG. 4 is a diagram illustrating processes of manufacture of the stator illustrated in FIG. 1.
Figure 5:
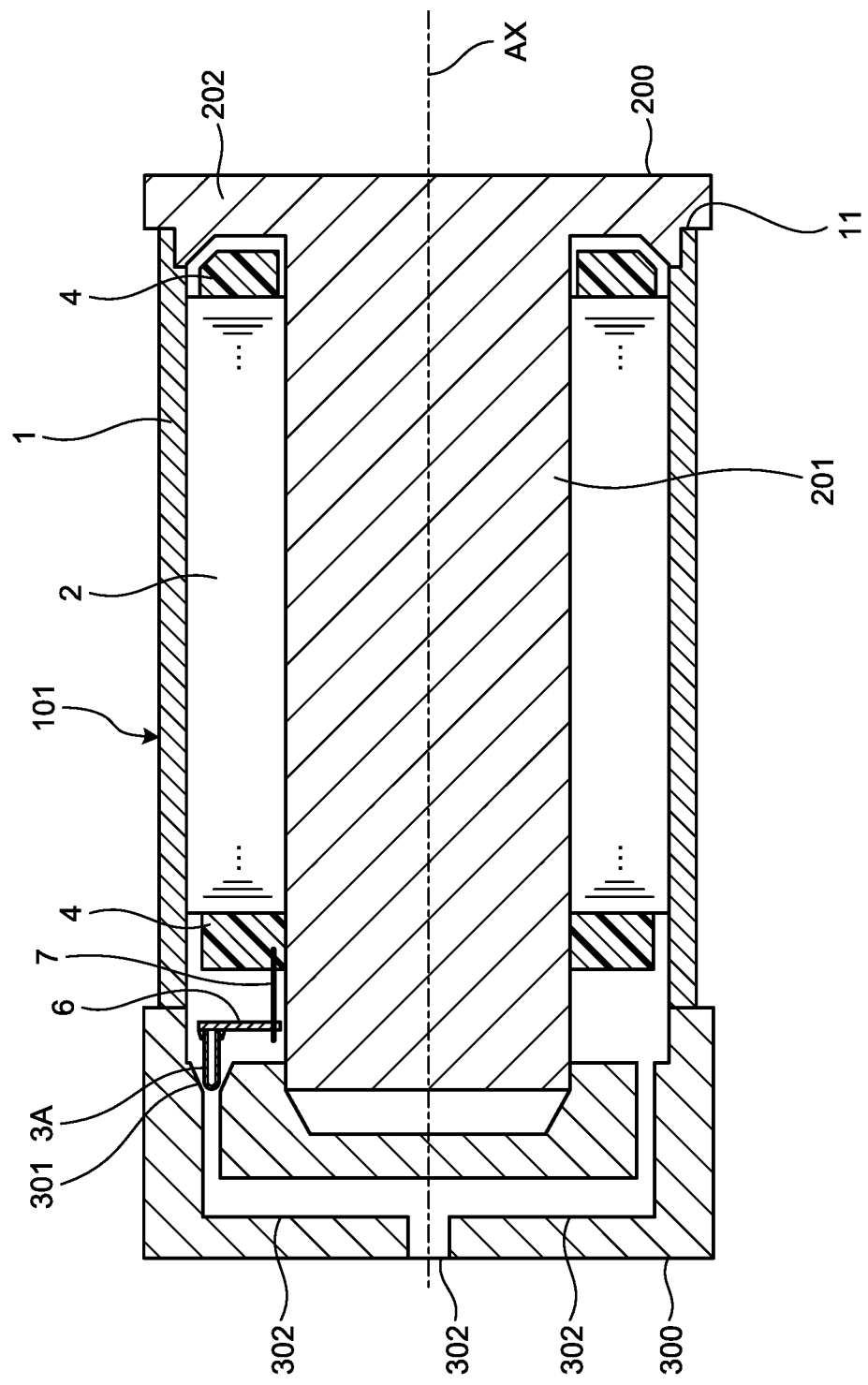
FIG. 5 is a diagram illustrating a state in which a stator assembly including a stator core and other components illustrated in FIG. 1 is accommodated in an upper die and a lower die.
Figure 6:
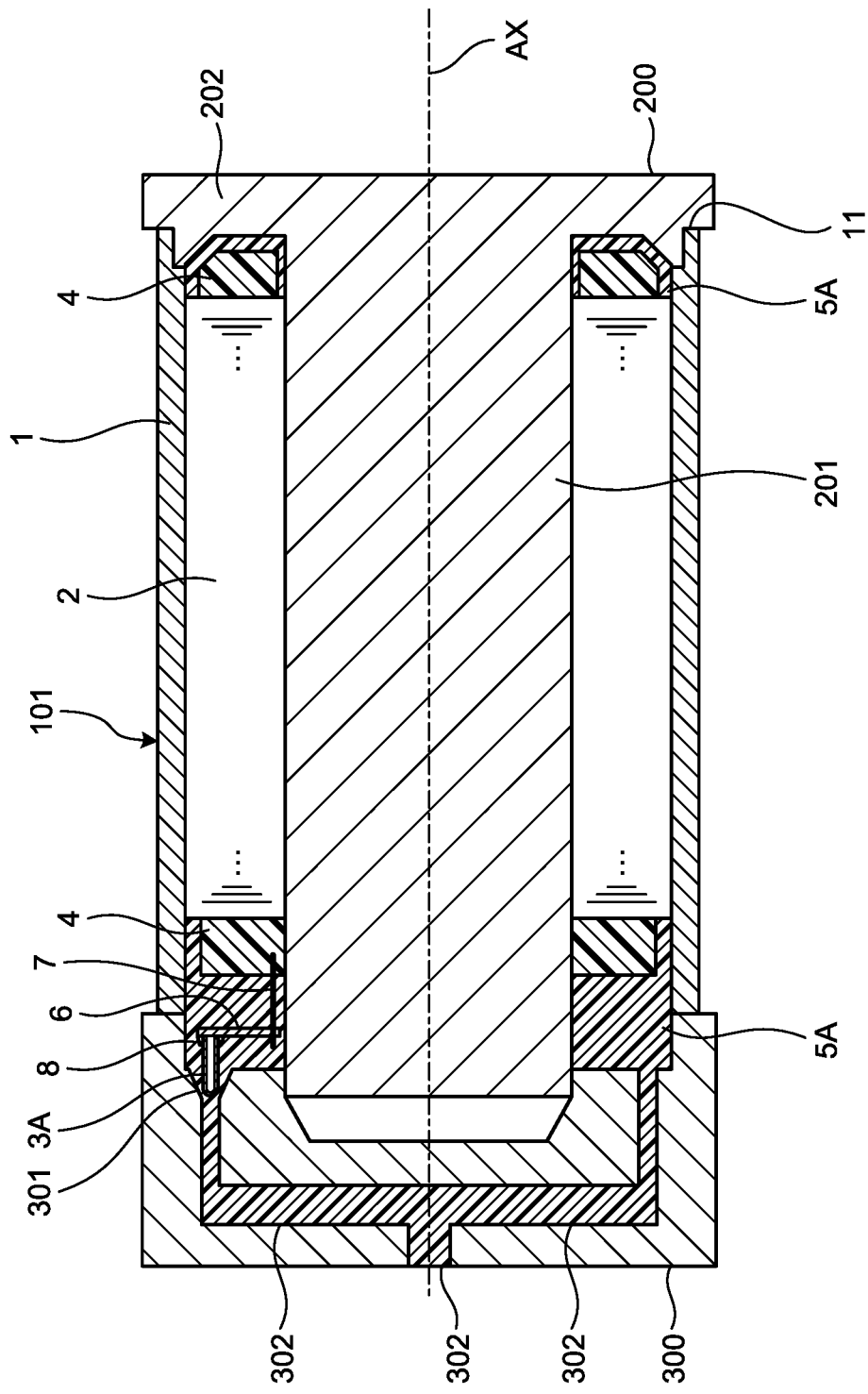
FIG. 6 is a diagram illustrating a state in which resin is injected in the upper die and the lower die illustrated in FIG. 5.
Figure 7:
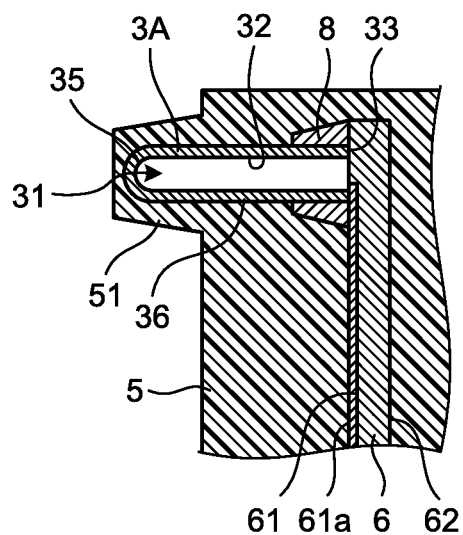
FIG. 7 is an enlarged view of the hollow terminal immediately after the upper die illustrated in FIG. 6 is removed.
Figure 8:
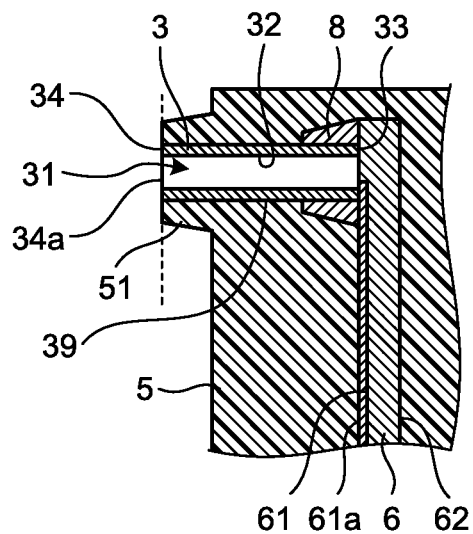
FIG. 8 is an enlarged view of the hollow terminal after a bottom part thereof is removed together with a protruding molding material illustrated in FIG. 7.
Figure 9:
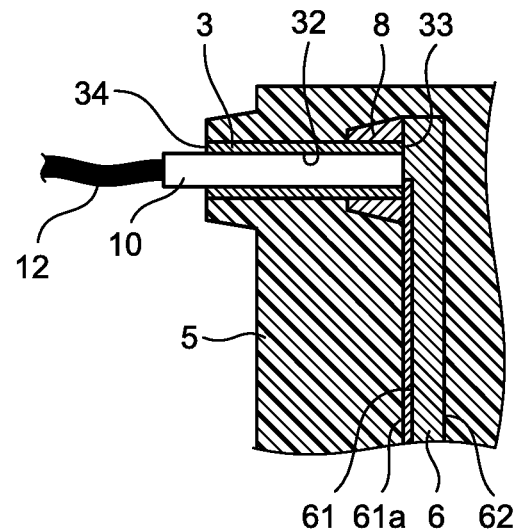
FIG. 9 is a diagram illustrating a state in which a terminal is inserted in the hollow terminal illustrated in FIG. 8.

Next, a method for manufacturing the stator 100 will be explained. FIG. 4 is a diagram illustrating processes of manufacture of the stator illustrated in FIG. 1. FIG. 5 is a diagram illustrating a state in which a stator assembly including the stator core and other components illustrated in FIG. 1 is accommodated in an upper die and a lower die. FIG. 6 is a diagram illustrating a state in which resin is injected in the upper die and the lower die illustrated in FIG. 5. FIG. 7 is an enlarged view of the hollow terminal immediately after the upper die illustrated in FIG. 6 is removed. FIG. 8 is an enlarged view of the hollow terminal after a bottom part thereof is removed together with a protruding molding material illustrated in FIG. 7. FIG. 9 is a diagram illustrating a state in which a terminal is inserted in the hollow terminal illustrated in FIG. 8. For manufacture of the stator 100 illustrated in FIG. 1, a conductive, bottomed cylindrical terminal 3A, the stator core 2, and the frame 1 are produced in step 1. Details of a method for producing the bottomed cylindrical terminal 3A will be described later. In step 2, the bottomed cylindrical terminal 3A is fixed to the printed circuit board 6 by soldering in a state in which the end 33 of the bottomed cylindrical terminal 3A is in contact with the printed circuit board 6. In addition, in step 2, the insulator 4 is mounted on the stator core 2. In step 3, the magnet wire is coiled around the stator core 2 with the insulator 4 therebetween to form the wire 7. In step 4, the stator core 2 with the wire 7 is press-fitted, shrink-fitted, or freeze-fitted into the frame 1, so that the stator core 2 and the frame 1 are integrated with each other.

In step 5 of FIG. 4, a lower die 200 is fitted to the stator core 2 and the frame 1 that are integrated. In this process, as illustrated in FIG. 5, a lower die core rod 201 of the lower die 200 is inserted into the stator core 2, and when a first end 11 of the frame 1 in the axial direction has come into contact with a mounting plate 202 of the lower die 200, fitting of the lower die 200 to the stator core 2 and the frame 1 is completed. After the lower die 200 is fitted to the stator core 2 and the frame 1, the printed circuit board 6 is placed to face the insulator 4 in step 6 of FIG. 4. An example of a method for placing the printed circuit board 6 is a method of producing a base part made of metal or resin in advance, mounting the base part on the insulator 4 or the stator core 2, and placing the printed circuit board 6 on the base part mounted on the insulator 4 or the stator core 2. In step 7 of FIG. 4, after the printed circuit board 6 is placed, the wire 7 is connected with the pattern wiring 61*a* on the printed circuit board 6 illustrated FIG. 2. The stator assembly 101 is thus obtained.

Subsequently, in step 8 of FIG. 4, an upper die 300 is fitted to the stator assembly 101. In the upper die 300, a gate 301 having an indentation shape into which an end of the bottomed cylindrical terminal 3A enters, and a gate 302 that communicates with the gate 301 and through which resin 5A is injected are formed. The shape of the gate 301 may be any shape that keeps the end of the bottomed cylindrical terminal 3A from coming in contact with the upper die 300 when fitting of the upper die 300 to the stator assembly 101 is completed and that makes the resin 5A covering the end of the bottomed cylindrical terminal 3A have a protruding shape. The aforementioned end of the bottomed cylindrical terminal 3A corresponds to the bottom part of the bottomed cylindrical terminal 3A. Details of the bottom part of the bottomed cylindrical terminal 3A will be described later.

After the upper die 300 is fitted to the stator assembly 101, resin 5A is injected into the gate 302 as illustrated in FIG. 6 in step 9 of FIG. 4. The resin 5A injected into the gate 302 reaches the bottomed cylindrical terminal 3A, the printed circuit board 6, and the insulator 4 on the upper die 300 side of the stator core 2 via the gate 301. The resin 5A further passes through gaps between teeth adjacent to each other in the rotating direction about the central axis AX among a plurality of teeth of the stator core 2, and reaches the insulator 4 on the lower die 200 side of the stator core 2. In this manner, the bottomed cylindrical terminal 3A, the solder 8 illustrated in FIG. 2, the pattern wiring 61*a* on the printed circuit board 6 illustrated in FIG. 2, the board surface 61 of the printed circuit board 6 illustrated in FIG. 2, the board surface 62 of the printed circuit board 6 illustrated in FIG. 2, and the insulator 4 are covered with the resin 5A. When the resin 5A cures, the molding material 5 and the protruding molding material 51 illustrated in FIG. 7 are formed. Note that the solder 8 is provided around the end on the printed circuit board 6 side of the bottomed cylindrical terminal 3A, and the gap between the end on the printed circuit board 6 side of the bottomed cylindrical terminal 3A and the printed circuit board 6 is thus blocked by the solder 8. The end on the side opposite to the printed circuit board 6 side of the bottomed cylindrical terminal 3A is blocked. In the process of injecting the resin in step 9, the resin 5A is thus prevented from entering the inside of the bottomed cylindrical terminal 3A through the ends of the bottomed cylindrical terminal 3A. Note that, because the end on the printed circuit board 6 side of the bottomed cylindrical terminal 3A is open, only one side of the bottomed cylindrical terminal 3A needs to be processed to be blocked in the production of the bottomed cylindrical terminal 3A, which shortens the time for production of the bottomed cylindrical terminal 3A as compared with a case where both sides of the bottomed cylindrical terminal 3A are to be blocked.

In step 10 of FIG. 4, the upper die 300 illustrated in FIG. 6 is removed. The shape of the bottomed cylindrical terminal 3A immediately after the upper die 300 is removed is a bottomed cylindrical shape as illustrated in FIG. 7. The bottomed cylindrical terminal 3A is constituted by a hollow cylindrical part 36 and a bottom part 35 at one end of the cylindrical part 36, and made of a metal sheet by drawing, for example. Part of the bottomed cylindrical terminal 3A having such a structure other than the part thereof covered with the solder 8 is covered with the molding material 5 and the protruding molding material 51 as illustrated in FIG. 7. In FIG. 7, the outer face 39 of the cylindrical part 36 of the bottomed cylindrical terminal 3A is covered with the molding material 5 and the protruding molding material 51, and the surface of the bottom part 35 of the bottomed cylindrical terminal 3A is covered with the protruding molding material 51. The protruding molding material 51 is part of the resin 5A filling the gap between the gate 301 and the bottomed cylindrical terminal 3A illustrated in FIG. 6 and being cured.

After the upper die 300 illustrated in FIG. 6 is removed, part of the protruding molding material 51 and the bottom part 35 illustrated in FIG. 7 are removed by cutting in step 11 of FIG. 4. Specifically, the bottom part 35 of the bottomed cylindrical terminal 3A covered with the protruding molding material 51 is removed with the protruding molding material 51. The part indicated by a broken line in FIG. 8 is the part that is cut. As a result, the end 34 of the hollow terminal 3 is exposed on the surface of the protruding molding material 51 remaining without being removed, and an opening 34a is formed at the exposed end 34 of the hollow terminal 3. The end face of the end 34 of the hollow terminal 3 and part of the outer face of the protruding molding material 51 constitute one flat face. The opening 34a formed at the end 34 of the hollow terminal 3 enables the cavity 31 defined by the inner face 32 of the hollow terminal 3 to communicate with the outside of the protruding molding material 51. The stator 100 illustrated in FIG. 1 is thus completed. A rotor, a plurality of bearings for rotatably supporting a shaft provided in the rotor, and a flange, to which outer rings of the bearings are fitted and which is fixed to the frame 1, are sequentially mounted on the stator 100.

A conductive terminal 10 is inserted into the cavity 31 of the hollow terminal 3 as illustrated in FIG. 9. Examples of the material for the terminal 10 include copper and a copper alloy. The terminal 10 may have a cylindrical shape or a polygonal prism shape. Wiring 12 extending from a device located outside the stator 100 is connected with the terminal 10. The device is, for example, a power conversion device that supplies power to the wire 7 of the stator 100. When the terminal 10 is inserted in the hollow terminal 3, the wiring 12 is electrically connected with the wire 7 illustrated in FIG. 1 via the terminal 10, the hollow terminal 3, the solder 8, and the pattern wiring 61a.

While the wiring 12 extending from an external device is electrically connected with the hollow terminal 3 via the terminal 10 in the present embodiment, the wiring 12 may be directly inserted in the hollow terminal 3 without the terminal 10. For example, in a case where the wiring 12 is a single wire, the cross section of the single-wire wiring 12 has such a size that can be inserted into the cavity 31 of the hollow terminal 3 illustrated in FIG. 8 and that at least part of the outer surface of the wiring 12 can come into contact with the inner face 32 of the hollow terminal 3. When such wiring 12 is inserted in the hollow terminal 3, the wiring 12 is electrically connected with the wire 7 illustrated in FIG. 1 via the hollow terminal 3, the solder 8, and the pattern wiring 61a.

Thus, voltage output from the power conversion device is applied to the wire 7, current flows through the wire 7 and a magnetic field is generated between the rotor and the stator core 2 illustrated in FIG. 1. In a case where a permanent magnet is used in the rotor, electromagnetic force is generated by interaction of the magnetic field generated by the permanent magnet and the aforementioned magnetic field, and rotates the rotor.

In the stator of the related art, because the terminal with which the wiring extending from a device outside the stator is to be connected does not have a hollow structure, the terminal needs to be sealed with a placed core, an insert, or the like before the die is filled with resin, for exposing part of the terminal to the outside of the molding material formed by cured resin and connecting the exposed terminal with the wiring. In this case, not only work of placing the placed core or the like in the die and work of removing the placed core or the like after completion of resin filling are needed, but also the shape of the die becomes complicated so as to allow space for the placed core or the like. In addition, in the stator of the related art, a method of exposing part of the terminal to the outside of the molding material formed by cured resin by attaching a sealing agent to the terminal and removing the sealing agent after completion of resin filling may be adopted instead of using a placed core or the like. In this case, work of attaching the sealing agent to the terminal and work of removing the sealing agent after resin filling is completed are needed. In addition, in the stator of the related art, for connecting wiring extending from a device outside the stator with the terminal exposed to the outside of the molding material formed by curing of resin, such work as welding, soldering, pressure bonding, or the like is needed. As described above, the stator of the related art requires much work for electrically connecting wiring extending from a device outside the stator with the terminal provided in the stator, which is troublesome and lowers the stator productivity.

In contrast, in the stator 100 according to the present embodiment, the bottomed cylindrical terminal 3A is used as illustrated in FIG. 6. The cavity 31 of the hollow terminal 3 can be exposed to the outside of the molding material 5 only by removing the end of bottomed cylindrical terminal 3A covered with the molding material 5 formed by the cured resin 5A together with the protruding molding material 51 without sealing the bottomed cylindrical terminal 3A with a placed core or the like when filling with resin 5A. Thus, the wiring 12 and the hollow terminal 3 can be electrically connected with each other only by inserting the wiring 12 or the terminal 10 into the cavity 31 of the hollow terminal 3 without performing such work as welding. The work for electrically connecting the wiring 12 with the hollow terminal 3 is therefore made simpler, and the productivity of the stator 100 is improved. In addition, because the frequency of occurrence of connection failure is reduced as compared with the case where welding or the like is performed, the risk of occurrence of connection failure during manufacture of the stator 100 and decreasing yield is reduced. In addition, because the frequency of occurrence of connection failure is reduced, the risk of the wiring 12 coming off from the hollow terminal 3 during operation of the motor including the stator 100, and stopping the motor is reduced. In addition, the stator 100 according to the present embodiment eliminates the need for a device for welding or the like and reduces the manufacture cost of the stator 100. In addition, in the stator 100 according to the present embodiment, because the cavity 31 of the hollow terminal 3 can be exposed to the outside of the molding material 5 only by removing the end of the bottomed cylindrical terminal 3A covered with the molding material 5 together with the protruding molding material 51, the connection between the hollow terminal 3 and the wiring 12 or the terminal 10 is easily formed. In addition, in the stator 100 according to the present embodiment, because it is sufficient to provide the gate 301 having a simple indentation shape into which the end of the hollow terminal 3 enters in the die without the need for machining the die to correspond to the shape of a placed core or the like, the shape of the die can be made simpler.

In a case where a solid conductive terminal that does not have a hollow structure, welding or the like needs to be performed in a state in which the wiring 12 extending from an external device is pressed against an end of the solid conductive terminal. The solid conductive terminal is a columnar terminal filled with a conductor. Thus, a holding mechanism for holding the state in which the wiring 12 is pressed against the end of the solid conductive terminal is needed. The holding mechanism may be integrated with the stator or may have a structure removable from the stator. In either case, production of the holding mechanism, work of mounting the holding mechanism onto the stator before being connected, and the like are needed, which lowers the stator productivity and increase the manufacture cost of the stator. In the case where the holding mechanism has a structure integrated with the stator, the stator has a larger outer size than the stator 100 according to the present embodiment, which includes no holding mechanism, which may limit the space for placing the stator. According to the stator 100 according to the present embodiment, because the wiring 12 or the terminal 10 can be connected with the hollow terminal 3 only by inserting the wiring 12 or the terminal 10 into the cavity 31 of the hollow terminal 3 without using the aforementioned holding mechanism, the productivity of the stator 100 is improved and the manufacture cost of the stator 100 is reduced.

Note that another method for manufacturing a stator of the related art is a method of connecting a lead wire with the solid conductive terminal in advance, and injecting resin in a state in which the lead wire is drawn out of a die. In this method, the stator assembly needs to be placed in the die after the lead wire is manually connected with the solid conductive terminal and is further manually drawn out from the die. Thus, such a method for manufacturing a stator has problems in requiring a long stator manufacture time and lowering the stator productivity. According to the stator 100 according to the present embodiment, after the end of the hollow terminal 3 covered with the molding material 5 is removed with the protruding molding material 51, and then the wiring 12 or the terminal 10 may be connected with the cavity 31 of the hollow terminal 3 exposed to the outside of the molding material 5. The manufacture time of the stator 100 is therefore shortened as compared with the case where a lead wire is connected with the solid conductive terminal in advance.

Methods for producing the bottomed cylindrical terminal 3A in step 1 illustrated in FIG. 4 will be explained below. Note that the bottomed cylindrical terminal 3A may have any structure in which resin 5A inserted in the die does not enter the inside of the bottomed cylindrical terminal 3A, and examples of the methods for producing the bottomed cylindrical terminal 3A include the following methods.

Figure 10:
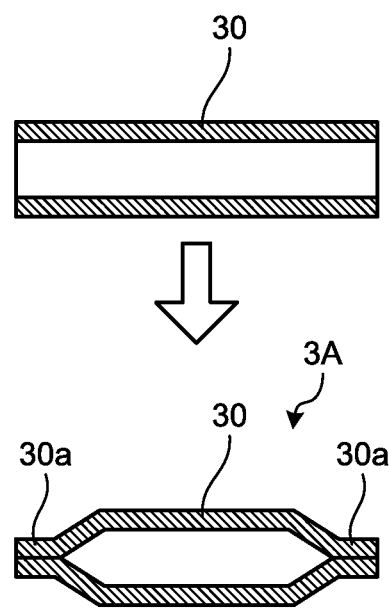
FIG. 10 is a diagram for explaining a first method for manufacturing the hollow terminal illustrated in FIG. 5.

FIG. 10 is a diagram for explaining a first method for manufacturing the hollow terminal illustrated in FIG. 5. A cylindrical member 30 illustrated in FIG. 10 is a conductive hollow pipe, an end of the cylindrical member 30 is squashed by heading, pressing, or the like, so that the opening formed at the end of the cylindrical member 30 is blocked, and a bottomed cylindrical terminal 3A including the blocking member 30a is thus produced. The blocking member 30a corresponds to the bottom part 35 illustrated in FIG. 7. Provision of the blocking member 30a prevents the resin 5A injected in the die from entering the inside of the cylindrical member 30. According to the manufacturing method illustrated in FIG. 10, the bottomed cylindrical terminal 3A can be easily produced by using an existing machining device. Note that, in a case where the end 33 of the bottomed cylindrical terminal 3A is fixed to the printed circuit board 6 by soldering as illustrated in FIG. 7, the blocking member 30a may be provided only on one side of the cylindrical member 30.

Figure 11:
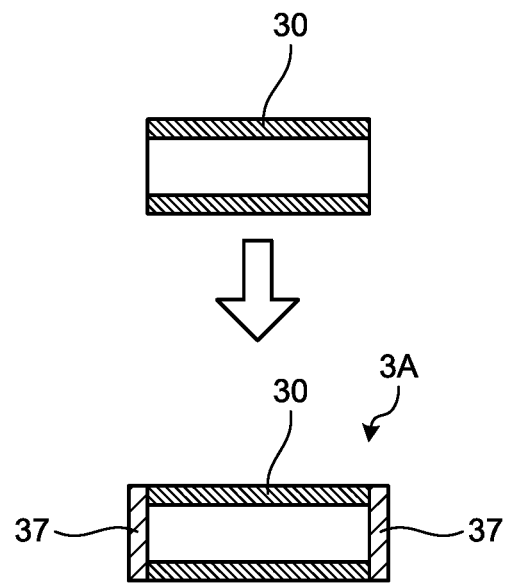
FIG. 11 is a diagram for explaining a second method for manufacturing the hollow terminal illustrated in FIG. 5.

FIG. 11 is a diagram for explaining a second method for manufacturing the hollow terminal illustrated in FIG. 5. A cylindrical member 30 illustrated in FIG. 11 is a conductive hollow pipe. An end of the cylindrical member 30 is melted by being heated to a high temperature, so that an opening formed at the end of the cylindrical member 30 is blocked, and a bottomed cylindrical terminal 3A including a fused part 37 is produced. The fused part 37 corresponds to the bottom part 35 illustrated in FIG. 7. Provision of the fused part 37 prevents the resin 5A injected in the die from entering the inside of the cylindrical member 30. Note that the fused part 37 may be formed by cutting the end of the cylindrical member 30 with laser. According to the manufacturing method illustrated in FIG. 11, the bottomed cylindrical terminal 3A can be produced only by melting the end of the cylindrical member 30 without using a device for heading or the like. Note that, in a case where the end 33 of the bottomed cylindrical terminal 3A is fixed to the printed circuit board 6 by soldering as illustrated in FIG. 7, the fused part 37 may be provided only on one side of the cylindrical member 30.

Figure 12:
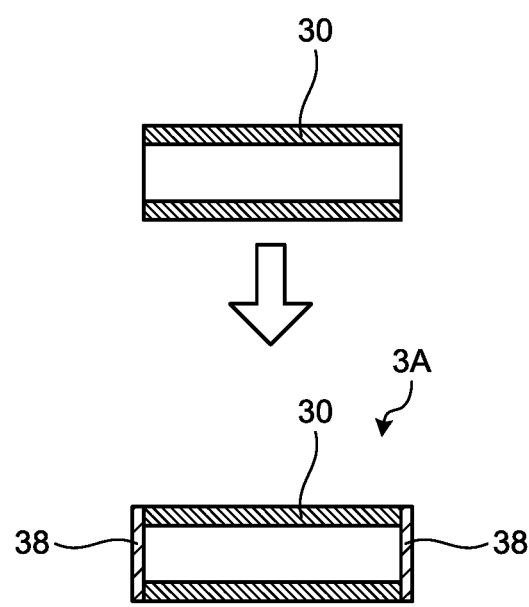
FIG. 12 is a diagram for explaining a third method for manufacturing the hollow terminal illustrated in FIG. 5.

FIG. 12 is a diagram for explaining a third method for manufacturing the hollow terminal illustrated in FIG. 5. A cylindrical member 30 illustrated in FIG. 12 is a conductive hollow pipe. The bottomed cylindrical terminal 3A is produced by providing a blocking member 38 at the end of the cylindrical member 30. The blocking member 38 is a member that blocks an opening formed at the end of the cylindrical member 30, and corresponds to the bottom part 35 illustrated in FIG. 7. The material for the blocking member 38 may be any material that is not melted by the heat of the resin 5A injected in the die, and examples of the material for the blocking member 38 include an adhesive, tape, a metal piece, and a resin piece. The metal piece or the resin piece may be a scrap or the like generated in a process of manufacture of the stator 100, for example. Provision of the blocking member 38 prevents the resin 5A injected in the die from entering the inside of the cylindrical member 30. According to the manufacturing method illustrated in FIG. 12, the bottomed cylindrical terminal 3A can be produced only by providing the blocking member 38 at the end of the cylindrical member 30 without using a device for heading or the like or a tool for melting the end of the cylindrical member 30. Note that, in a case where the end 33 of the bottomed cylindrical terminal 3A is fixed to the printed circuit board 6 by soldering as illustrated in FIG. 7, the blocking member 38 may be provided only on one side of the cylindrical member 30.

Figure 13:
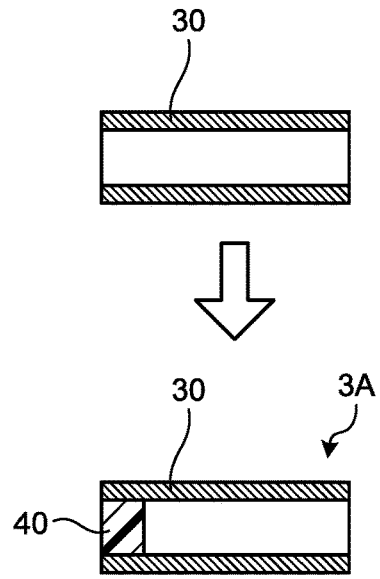
FIG. 13 is a diagram for explaining a fourth method for manufacturing the hollow terminal illustrated in FIG. 5.

FIG. 13 is a diagram for explaining a fourth method for manufacturing the hollow terminal illustrated in FIG. 5. A cylindrical member 30 illustrated in FIG. 13 is a conductive hollow pipe. The bottomed cylindrical terminal 3A is produced by filling the inside of the cylindrical member 30 with a filler 40 to block the cavity formed in the cylindrical member 30. In the cylindrical member 30 illustrated in FIG. 13, only a first end side of the cylindrical member 30 is filled with the filler 40. The material for the filler 40 is silicone resin or the like, but may be any material that is not melted by the heat of the resin 5A injected in the die and that has such fluidity that is discharged to the outside of the bottomed cylindrical terminal 3A when the wiring 12 or the terminal 10 illustrated in FIG. 9 is inserted, and is not limited to silicone resin. The filler 40 corresponds to the bottom part 35 illustrated in FIG. 7. Provision of the filler 40 prevents the resin 5A injected in the die from entering the inside of the cylindrical member 30 from the first end side of the cylindrical member 30. According to the manufacturing method illustrated in FIG. 13, the bottomed cylindrical terminal 3A can be produced only by filling the inside of the cylindrical member 30 with the filler 40 without using a device for heading or the like or a tool for melting the end of the cylindrical member 30. Note that, in the cylindrical member 30 illustrated in FIG. 13, only the first end side of the cylindrical member 30 is filled with the filler 40 and the second end of the cylindrical member 30 is not filled with the filler 40. With such a structure as well, the second end of the cylindrical member 30 illustrated in FIG. 13 is in contact with the printed circuit board 6 illustrated in FIG. 7 and covered with the solder 8. As a result, the resin 5A is prevented from entering the inside of the cylindrical member 30 from the second end of the cylindrical member 30.

Figure 14:
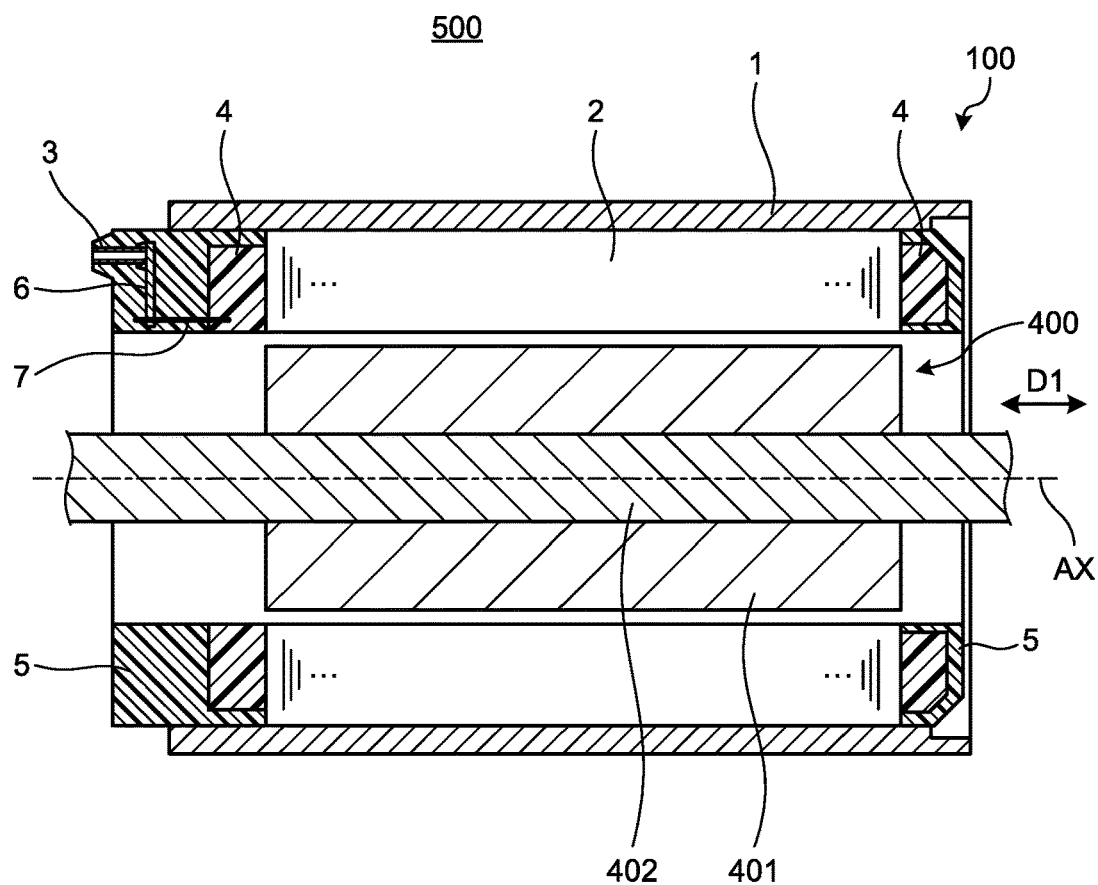
FIG. 14 is a cross-sectional view of a motor according to the embodiment of the present invention.

FIG. 14 is a cross-sectional view of a motor according to the embodiment of the present invention. The motor 500 illustrated in FIG. 14 includes the stator 100 illustrated in FIG. 1, and a rotor 400. The motor 500 is a synchronous motor or an induction motor. The rotor 400 includes a cylindrical rotor core 401, and a shaft 402 extending through the rotor core 401 in the axial direction. The rotor 400 includes a plurality of bearings for rotatably supporting the shaft 402, and a flange, in addition to the rotor core 401 and the shaft 402. In FIG. 14, the bearings and the flange are not illustrated. The flange is an annular member fixed to an end of the frame 1. The outer circumferences of the bearings are fixed to a central portion of the flange in the radial direction. In this manner, the rotor 400 is rotatably supported on the inside of the stator 100.

In a case where a solid conductive terminal is used, an end of the wiring 12 or the terminal 10 is in contact with the vicinity of an end of the conductive terminal, and the contact area is therefore small. In the motor 500 according to the present embodiment including the hollow terminal 3, the area of contact between the inner face of the hollow terminal 3 and the outer face of the wiring or the terminal inserted in the hollow terminal 3 is larger than that in a case where a solid conductive terminal is used. Thus, electrical resistance at the contact is reduced, and the motor efficiency and the motor output are improved.

Figure 15:
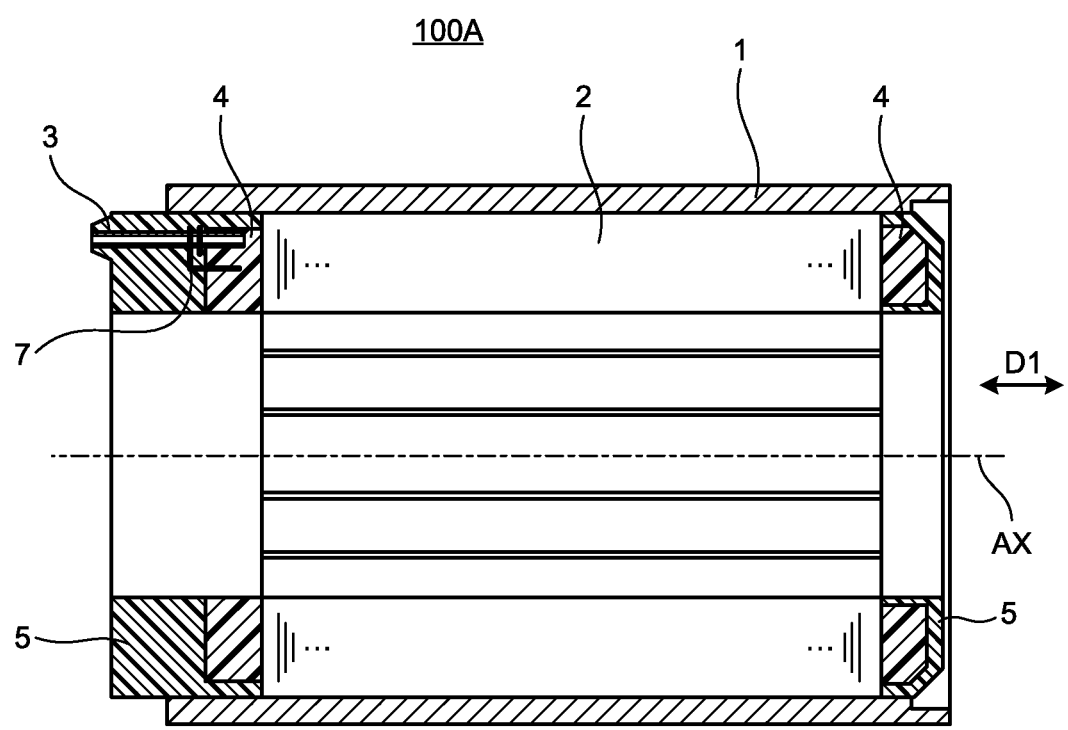
FIG. 15 is a cross-sectional view of a stator according to a modification of the embodiment of the present invention.

Note that the hollow terminal 3 or the bottomed cylindrical terminal 3A illustrated in FIGS. 1 to 13 can also be used as a binding pin mentioned above. FIG. 15 is a cross-sectional view of a stator according to a modification of the embodiment of the present invention. In the stator 100A illustrated in FIG. 15, the hollow terminal 3 is fixed to the insulator 4 in such a manner that the end on the insulator 4 side of the hollow terminal 3 is inserted in the insulator 4 by press fitting or the like. Other structure is the same as or equivalent to that of the stator 100 illustrated in FIG. 1, and the same or equivalent components are represented by the same reference numerals and redundant description will not be repeated. Note that the printed circuit board 6 illustrated in FIG. 1 is not illustrated in FIG. 15.

Because the hollow terminal 3 is press-fitted to the insulator 4, even when the end on the insulator 4 side of the hollow terminal 3 is open, the opening is blocked by the insulator 4. This prevents the resin 5A injected in the die from entering the inside of the hollow terminal 3 from the opening on the insulator 4 side of the hollow terminal 3. In addition, because only one side of the hollow terminal 3 needs to be processed to be blocked in the manufacture of the hollow terminal 3, the manufacture time of the hollow terminal 3 is shortened as compared with a case where both sides of the hollow terminal 3 are blocked. In addition, as illustrated in FIG. 15, the end of the wire 7 is wound around the hollow terminal 3, which reduces the number of binding pins as compared with the stator 100 illustrated in FIG. 1.

Note that, for the terminal 10 illustrated in FIG. 9, a terminal connected with the wiring 12 extending from a device outside the terminal 10 in advance may be used or a terminal provided in the stator 100, 100A in advance may be used.

While the hollow terminal 3 or the bottomed cylindrical terminal 3A are provided at a position closer to the outer side in the radial direction of the printed circuit board 6, the position of the hollow terminal 3 or the bottomed cylindrical terminal 3A is not limited thereto as long as the surface of the bottom part 35 can be covered with the resin 5A and the molding material 5 covering the surface of the bottom part 35 can be removed together with the bottom part 35. For example, the hollow terminal 3 or the bottomed cylindrical terminal 3A may be provided at a position closer to the inner side in the radial direction of the printed circuit board 6 or at a position closer to the inner side in the radial direction of the insulator 4.

The configurations presented in the embodiment above are examples of the present invention, and can be combined with other known technologies or can be partly omitted or modified without departing from the scope of the present invention.

REFERENCE SIGNS LIST 1 frame; 2 stator core; 3 hollow terminal; 3A bottomed cylindrical terminal; 4 insulator; 5 molding material; 5A resin; 6 printed circuit board; 7 wire; 8 solder; 10 terminal; 11 first end; 12 wiring; 30 cylindrical member; 30a blocking member; 31 cavity; 32 inner face; 33, 34 end; 34a opening; 35 bottom part; 36 cylindrical part; 37 fused part; 38 blocking member; 39 outer face; 40 filler; 51 protruding molding material; 61, board surface; 61a pattern wiring; 100, 100A stator; 101 stator assembly; 200 lower die; 201 lower die core rod; 202 mounting plate; 300 upper die; 301, 302 gate; 401 rotor core; 402 shaft; 500 motor.

The invention claimed is:

1. A stator comprising a stator core, the stator further comprising:
  a cylindrical hollow terminal through which the stator is to be electrically connected; and
  a molding material covering the stator core and an outer face of the hollow terminal, wherein
  an inner face of the hollow terminal is exposed from the molding material, and a first end of the hollow terminal is open to an outside of the molding material, wherein
  a second end of the hollow terminal is fixed to a printed circuit board by soldering in a state in which the second end is open.

2. A stator comprising a stator core, the stator further comprising:
  a cylindrical hollow terminal through which the stator is to be electrically connected; and
  a molding material covering the stator core and an outer face of the hollow terminal,
  an insulator provided on the stator core; and
  a wire wound around the stator core with the insulator therebetween, wherein
  an inner face of the hollow terminal is exposed from the molding material, and a first end of the hollow terminal is open to an outside of the molding material, a second end of the hollow terminal is fixed to the insulator, and an end of the wire is wound around the hollow terminal, wherein the second end of the hollow terminal is fixed to the insulator in a state in which the second end is open.

3. A motor comprising: the stator according to claim 1; and a rotor.

4. A motor comprising: the stator according to claim 2; and a rotor.

* * * * *